United States Patent
Maufer et al.

(10) Patent No.: US 6,683,882 B1
(45) Date of Patent: Jan. 27, 2004

(54) METHOD AND SYSTEM FOR DIRECTING TRANSMISSION OF IPX CONTROL PACKETS TO INFLUENCE RECEPTION OF IPX DATA PACKETS

(75) Inventors: Thomas Albert Maufer, Santa Clara, CA (US); Roman Baker, San Jose, CA (US)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/437,592

(22) Filed: Nov. 9, 1999

(51) Int. Cl.⁷ .............................................. H04L 12/28
(52) U.S. Cl. ...................................................... 370/401
(58) Field of Search ................................ 370/400–402, 370/467–470, 496–498, 245–248, 216–220, 242, 432, 254–258, 409, 244, 224; 379/114.28, 114.01, 114.14, 230; 714/4, 43–48, 24; 709/222, 250, 105, 239, 235, 223

(56) References Cited

U.S. PATENT DOCUMENTS

| | | | | |
|---|---|---|---|---|
| 5,596,723 A | * | 1/1997 | Romohr | 709/222 |
| 5,917,808 A | * | 6/1999 | Kosbab | 370/254 |
| 5,917,820 A | * | 6/1999 | Rekhter | 370/392 |
| 6,151,297 A | * | 11/2000 | Congdon et al. | 370/216 |
| 6,208,616 B1 | * | 3/2001 | Mahalingam et al. | 370/216 |
| 6,490,632 B1 | * | 12/2002 | Vepa et al. | 709/250 |

* cited by examiner

*Primary Examiner*—Chi Pham
*Assistant Examiner*—Prenell Jones

(57) ABSTRACT

A method and system for directing transmission of internetwork packet exchange (IPX) control packets to influence reception of IPX data packets. Specifically, one embodiment of the present invention includes a method for directing transmission of an internetwork packet exchange (IPX) control packet. The method includes the step of determining a primary NIC from a plurality of NICs of a server computer system. Additionally, the method includes the step of recognizing an IPX control packet before the IPX control packet is transmitted over a network. Furthermore, the method includes the step of directing the IPX control packet to be transmitted over the network by the primary NIC.

24 Claims, 4 Drawing Sheets

METHOD AND SYSTEM FOR DIRECTING TRANSMISSION OF IPX CONTROL PACKETS TO INFLUENCE RECEPTION OF IPX DATA PACKETS

TECHNICAL FIELD

The present invention generally relates to the field of computer networking. More particularly, the present invention relates to the field of internetwork packet exchange (IPX) control data.

BACKGROUND ART

Computers have become an integral tool used in a wide variety of different applications, such as in finance and commercial transactions, computer-aided design and manufacturing, health care, telecommunication, education, etc. Computers are finding new applications as a result of advances in hardware technology and rapid development in software technology. Furthermore, a computer system's functionality is dramatically enhanced by coupling stand-alone computers together to form a computer network. In a computer network, users may readily exchange files, share information stored on a common database, pool resources, and communicate via electronic mail (e-mail) and via video teleconferencing.

One popular type of computer network is known as a local area network (LAN). LANs connect multiple computer systems together such that the users of the computer systems can access the same information and share data. Typically, in order to be connected to a LAN, a general purpose computer system requires an expansion board generally known as a network interface card (NIC). Essentially, the NIC works with the operating system and central processing unit (CPU) of the host computer system to control the flow of information over the LAN. Some NICs may also be used to connect a computer system to a wide area network (WAN) and/or the Internet.

Contemporary networks such as a LAN or a WAN typically include one or more server computer systems connected together with multiple client computer systems. Furthermore, a server computer system is typically coupled to the network using more than one NIC. As such, multiple NICs of the server computer system increase its total available bandwidth capacity for transmitting and sending data packets. Moreover, multiple NICs also provide resiliency and redundancy if one of the server's NICs fails.

It is desirable to balance the transmission traffic over each NIC when multiple NICs are used, which is typically referred to as load balancing, so that one NIC does not handle too much traffic and become a bottleneck. The use of load balancing allows the spare capacity provided by the multiple NICs to be effectively utilized. It is not necessary to hold a NIC in reserve in case one of the NICs fails. Instead, all NICs can be used, thereby increasing the overall performance of the server computer system and hence the network.

With reference to FIG. 1, which is a block diagram of a prior art LAN 106 which communicatively connects an internetwork packet exchange (IPX) based server computer system 102 to a client computer system 104. It is appreciated that IPX server computer system 102 is connected to LAN 106 using four NICs while client computer system 104 is connected to LAN 106 using a single NIC. It should be appreciated that IPX server computer system 102 may have any number of NICs, according to its bus architecture and available slots. Specifically, IPX server computer system 102 utilizes its four NICs to transmit different types of IPX data packets to client computer system 104 in a round-robin manner in order to perform transmission load balancing. In the typical round-robin approach, a first IPX data packet is sent out by IPX server 102 using a first NIC, a second IPX data packet using a second NIC, and so on. When all NICs have been used to send out an IPX data packet, the sequence returns to the first. NIC and the cycle is repeated. In this manner, IPX server 102 increases its bandwidth for transmitting IPX data, packets to client 104 over LAN 106.

It should be appreciated that there are disadvantages associated with having IPX server 102 performing the typical round-robin approach within some networks. One of the disadvantages is that during certain circumstances, client 104 could potentially get confused as to which IPX layer address of IPX server 102 to send IPX data packets to. Specifically, when IPX server 102 transmits IPX data packets in the typical round-robin approach, it utilizes several NICs each having a different IPX layer address. As such, client 104 can receive several IPX data packets from IPX server 102, each having a different IPX layer address. Consequently, client 104 may begin to send IPX data packets to one of the NICs of IPX server 102 which does not support reception of IPX data packets. Therefore, communication between IPX server 102 and client 104 is unsuccessful because of confusion within client 104.

Accordingly, a need exists for a method and system for providing true IPX load balancing in such a way that does not introduce the possibility of confusion within the network.

DISCLOSURE OF THE INVENTION

One embodiment of the present invention provides a method and system for providing true IPX load balancing that does not introduce the possibility of confusion within the network. Specifically, one embodiment of the present invention operates within a server computer system adapted with a plurality of network interface cards (NICs) coupled thereto. This embodiment includes a method for directing transmission of an internetwork packet exchange (IPX) control packet. The method includes the step of determining a primary NIC from a plurality of NICs of the server computer system. Additionally, the method includes the step of recognizing an IPX control packet before the IPX control packet is transmitted over a network. Furthermore, the method includes the step of directing the IPX control packet to be transmitted over the network by the primary NIC.

In another embodiment, the present invention includes a computer readable medium having computer readable code embodied therein for causing a computer to perform particular steps. Specifically, one of the steps is determining a primary NIC from a plurality of NICs of a server computer system. Furthermore, another one of the steps is causing an IPX control packet of the server computer system to be transmitted over a network by the primary NIC which is coupled to the network.

In still another embodiment, the present invention operates within a computer system. This embodiment includes a method for directing transmission of an IPX control packet. The method includes the computer implemented step of determining a primary NIC from a plurality of NICs of a server computer system. Moreover, the method includes the computer implemented step of recognizing an IPX control packet before the IPX control packet is transmitted over a network. Additionally, the method includes the computer implemented step of directing the IPX control packet to be transmitted over the network by the primary NIC.

In another embodiment, the present invention includes a computer system which includes a processor which is coupled to an addressable data bus. The computer system also includes a computer readable memory coupled to communicate with the processor for performing a method for directing transmission of an IPX control packet. The method includes the step of determining a primary NIC from a plurality of NICs of a server computer system. Furthermore, the method includes the step of recognizing an IPX control packet before the IPX control packet is transmitted over a network. Additionally, the method includes the step of directing the IPX control packet to be transmitted over the network by the primary NIC.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1:
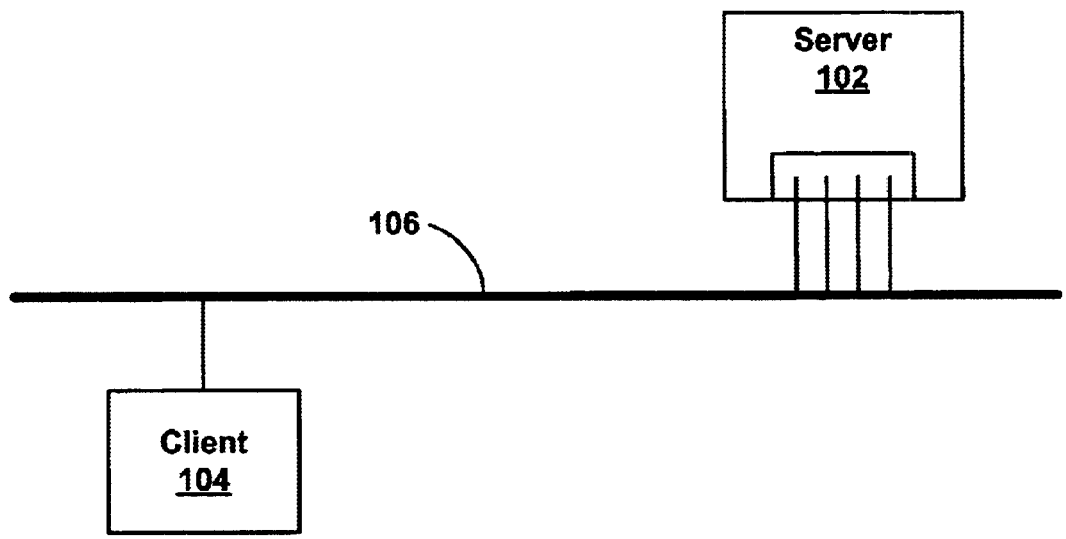
FIG. 1 is a block diagram of a prior art local area network (LAN) which communicatively connects an internetwork packet exchange (IPX) based server computer system to a client computer system.

The drawings referred to in this description should not be understood as being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "recognizing", "directing", "causing", "activating", "configuring", "executing", "outputting", "performing", "transmitting", "determining", "receiving", "using" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

EXEMPLARY COMPUTER SYSTEM ENVIRONMENTS OF THE PRESENT INVENTION

Figure 2:
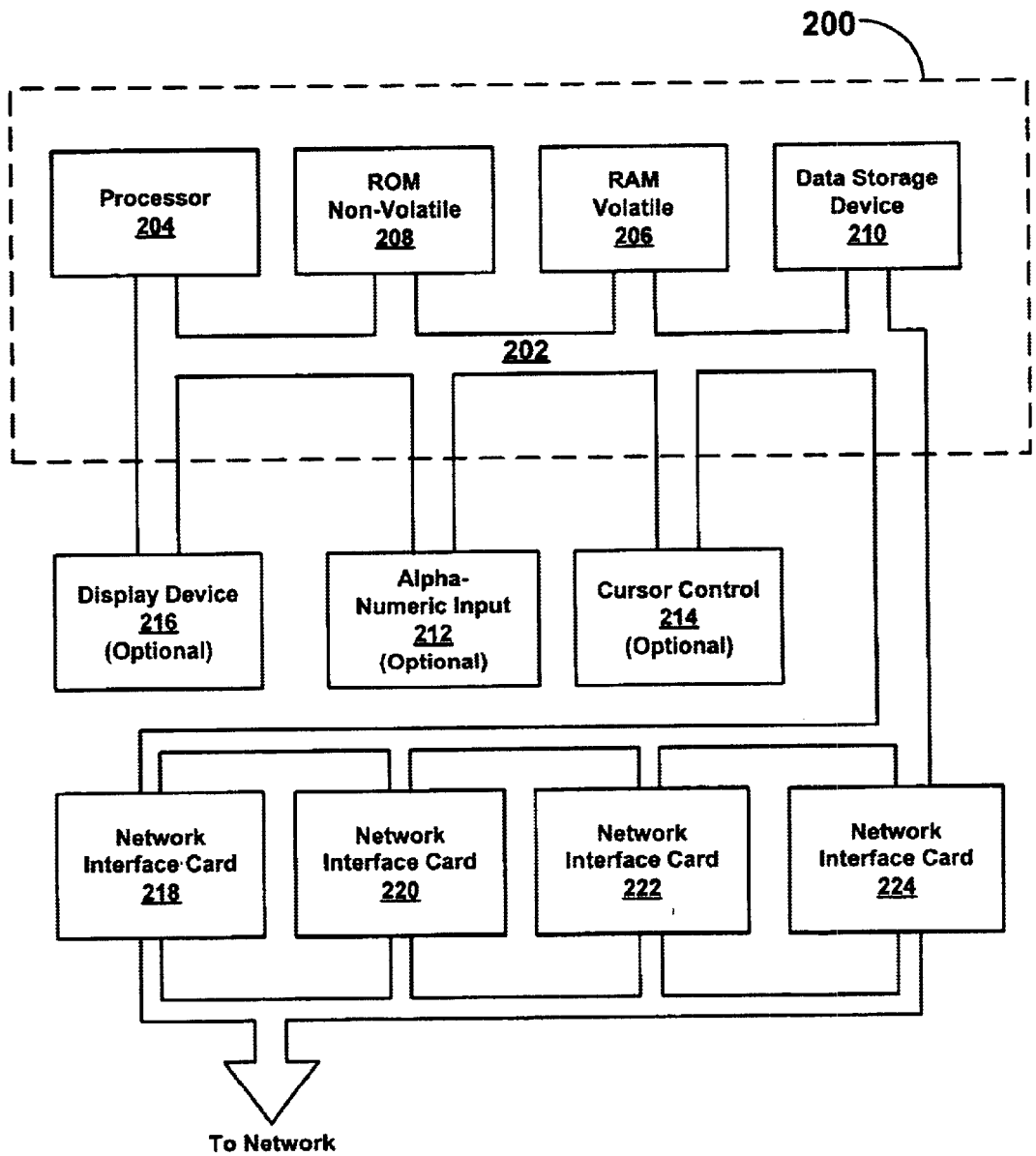
FIG. 2 is a block diagram of an exemplary server computer system upon which embodiments of the present invention may be implemented.

With reference now to FIG. 2, portions of the present method and system are comprised of computer-readable and computer-executable instructions which reside, for example, in computer-usable media of a computer system. FIG. 2 illustrates an exemplary server computer system 200 used during implementation of different embodiments in accordance with the present invention. It is appreciated that server computer system 200 of FIG. 2 is exemplary only and that the present invention can operate within a number of different computer systems including general purpose networked computer systems, embedded computer systems, and stand alone computer systems.

Server computer system 200 of FIG. 2 includes an address/data bus 202 for communicating information, and a central processor unit 204 coupled to bus 202 for processing information and instructions. Central processor unit 204 may be an 80×86-family microprocessor or any other type of processor. Server computer system 200 also includes data storage features such as a computer usable volatile memory 206 (e.g., random access memory, static RAM, dynamic RAM, etc.) coupled to bus 202 for storing information and instructions for central processor unit 204, computer usable non-volatile memory 208 (e.g., read only memory, programmable ROM, flash memory, EPROM, EEPROM, etc.) coupled to bus 202 for storing static information and instructions for the central processor unit 204, and a data storage unit 210 (e.g., a magnetic or optical disk and disk drive) coupled to bus 202 for storing information and instructions. Server computer system 200 of the present invention also includes an optional alphanumeric input device 212, which includes alphanumeric and function keys, is coupled to bus 202 for communicating information and command selections to central processor unit 204. Server computer system 200 also optionally includes a cursor control device 214 coupled to bus 202 for communicating user input information and command selections to central processor unit 204. Server computer system 200 of the present embodiment also includes an optional display device 216 coupled to bus 202 for displaying information.

Referring still to FIG. 2, optional display device 216 may be a liquid crystal device, cathode ray tube, or other display device suitable for creating graphic images and alphanumeric characters recognizable to a user. Optional cursor control device 214 allows the computer user to dynamically signal the two dimensional movement of a visible symbol (cursor) on a display screen of display device 216. Many implementations of cursor control device 214 are known in the art including a mouse, trackball, touch pad, joystick or special keys on alphanumeric input device 212 capable of signaling movement of a given direction or manner of displacement. Alternatively, it is appreciated that a cursor can be directed and/or activated via input from alphanumeric input device 212 using special keys and key sequence commands. The present embodiment is also well suited to directing a cursor by other means such as, for example, voice commands.

With reference still to FIG. 2, server computer system 200 is adapted to be coupled via bus 202 to a plurality of network interface cards (NICs) exemplified by NICs 218, 220, 222 and 224. NICs 218–224 provide the physical communication link between server computer system 200 and a network of client computer systems and other server computer systems (not shown). Any of a number of different and well known types of NICs may be used to communicate with the network of client and server computer systems. It is appreciated that any number of NICs may be utilized in accordance with the present invention. It is further appreciated that NICs 218–224 may be integrated into server computer system 200 or they may be externally coupled to server computer system 200.

Figure 3:
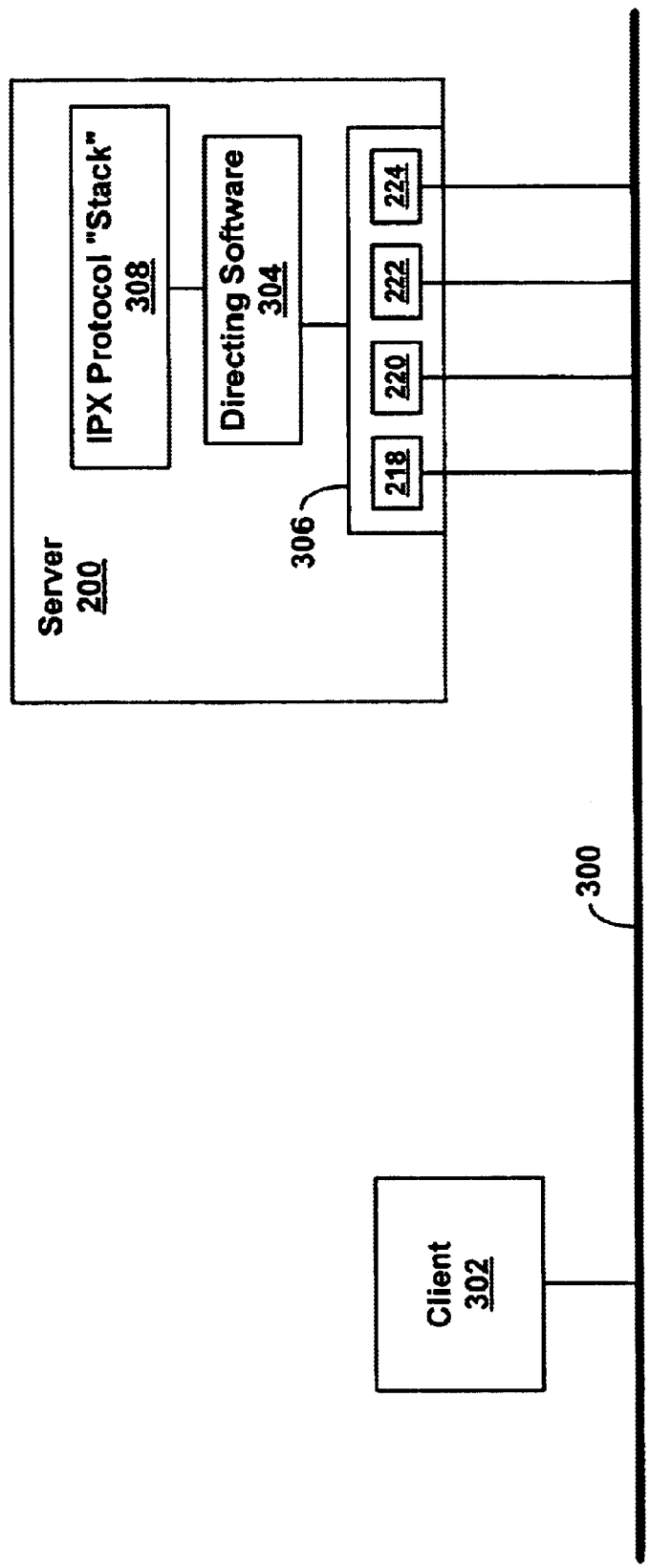
FIG. 3 is a block diagram of a LAN which is part of a system utilized for directing transmission of IPX control packets to be output in accordance with one embodiment of the present invention.

Referring now to FIG. 3, which is a block diagram of a local area network (LAN) 300 which is part of a system utilized for directing transmission of IPX control packets to be output in accordance with one embodiment of the present invention. It is appreciated that IPX based server computer system 200 and a client computer system 302 are coupled together via LAN 300. As such, IPX server computer system 200 and client computer system 302 are able to communicate. Although LAN 300 is shown, the present embodiment is also well suited to be used within various other network configurations, e.g., wide area network (WAN).

It should be appreciated that a networking operating system (e.g., Novell Netware, Microsoft Windows NT, etc.) is running on both IPX server computer system 200 and client computer system 302. It should be further appreciated that IPX server computer system 200 and client computer system 302 need not run the same operating system, but both should be using IPX to communicate. Furthermore, within IPX server computer system 200, directing software 304 of the present embodiment operates in conjunction with one embodiment of DynamicAccese® software 306 in accordance with the present invention. In general, directing software 304 fools IPX protocol stack 308 (coupled to directing software 304) into thinking that there is only one NIC operating within IPX server computer system 200. The IPX stack 308's node address is "network.primaryMAC", where the "network" is the network number of LAN 300 that IPX server computer system 200 is attached to. Additionally, "primaryMAC" is one of IPX server computer system 200's "n" MAC addresses chosen by directing software 304. As such, the present embodiment ensures that control packets are always sent out from the primary NIC of IPX server computer system 200 so that the IPX source address is "network.primaryMAC" and the MAC source address is "primaryMAC".

Furthermore, DynamicAccese® software 306 represents a system and method for sending and receiving data packets over LAN 300 from IPX server computer system 200 which NICs 218–224 are coupled thereto. DynamicAccese® software 306 may incorporate features such as fault tolerance, class of service (for assigning a priority to outgoing data packets), multicast registration, and support of virtual local area networks (VLANs). The implementation and operation of the present embodiment is described in detail below with reference to FIG. 4.

DETAILED DESCRIPTION OF THE EXEMPLARY STRUCTURE AND OPERATION OF THE PRESENT INVENTION

Figure 4:
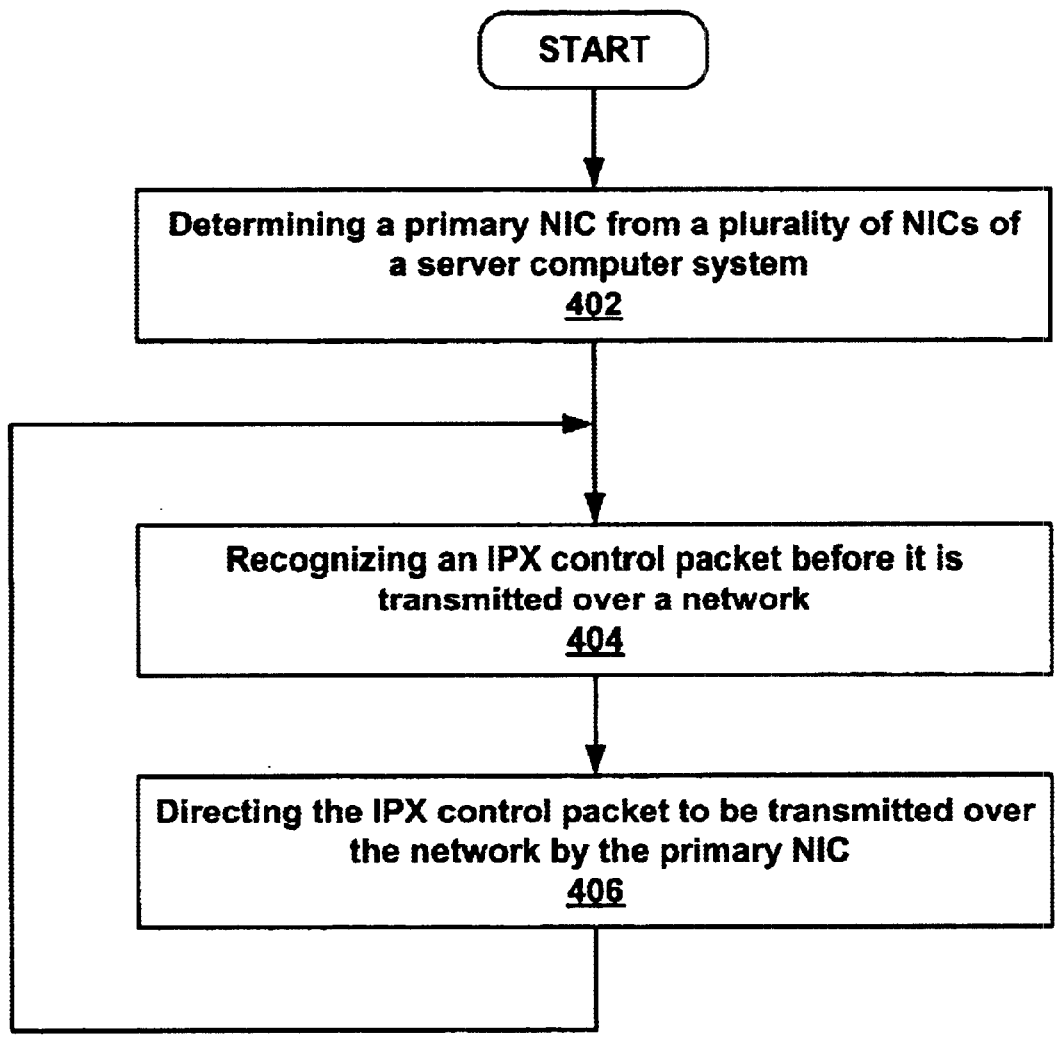
FIG. 4 is a flowchart of steps performed in accordance with one embodiment of the present invention for directing transmission of IPX control packets to be output by a primary NIC.

With reference to FIG. 4, which is a flowchart 400 of steps performed in accordance with one embodiment of the present invention for directing transmission of IPX control packets to be output by a primary NIC. Flowchart 400 includes processes of the present invention which, in one embodiment, are carried out by a processor and electrical components under the control of computer readable and computer executable instructions. The computer readable and computer executable instructions reside, for example, in data storage features such as computer usable volatile memory 206 and/or computer usable non-volatile memory 208 of FIG. 2. Although specific steps are disclosed in flowchart 400, such steps are exemplary. That is, the present invention is well suited to performing various other steps or variations of the steps recited in FIG. 4.

The basic idea of the present embodiment of flowchart 400 is to direct any IPX control packets (e.g., Routing Information Protocol (RIP) packets, Service Advertising Protocol (SAP) packets, Network Basic Input/Output System (NetBIOS) "name recognized" packets, and the like) to be specifically transmitted by a primary NIC of a server computer system over a network. In this manner, all clients coupled to the network are caused to contact the server via its primary, NIC. As such, the server computer system is able to receive IPX control packets, but does not have a need to support receive load balancing.

In step 402 of FIG. 4, the present embodiment determines a primary NIC (e.g., 218) from NICs 218–224 (FIG. 4) of server computer system 200. It should be appreciated that the present embodiment could choose any one of NICs 218–224 of server computer system 200 as the primary NIC at step 402. It should be further appreciated that the present embodiment of step 402 can be performed using a variety of techniques.

At step 404, the present embodiment recognizes an IPX control packet before it is transmitted over LAN 300 by server computer system 200. Within the present embodiment, it is appreciated that an IPX data packet can be a RIP packet, SAP packets, NetBIOS "name recognized"

packet, and the like, which are well known by those of ordinary skill in the art. Specifically, the SAP and NetBIOS "name recognized" packets are two types of traffic that server computer system 200 can use to advertise its name-to-address mapping. Furthermore, the RIP packets can be used by server computer system 200 to advertise a path to itself. Within the present embodiment, LAN 300 could be any type of network, e.g., a wide area network (WAN).

In step 406 of FIG. 4, the present embodiment directs the IPX control packet to be transmitted over LAN 300 by the primary NIC (e.g., 218) of server computer system 200. Therefore, by having all IPX control packets transmitted over LAN 300 by the primary NIC, client 302 and any other clients and routers coupled to LAN 300 will learn that the path to server 200 is via the primary NIC (e.g., 218). As such, server computer system 200 is able to receive IPX control packets and does not have a need to support receive load balancing. After completing step 406, the present embodiment proceeds to the beginning of step 404.

It should be appreciated that the present embodiment of flowchart 400 is performed by directing software 304 operating in conjunction with DynamicAccess® software 306 in accordance with one embodiment of the present invention.

It is important to point out that other techniques beside that described in flowchart 400 of FIG. 4 can be implemented together within server computer system 200 of FIG. 2. In this manner, server computer system 200 is enabled to perform transmission IPX load balancing over a network (e.g., LAN 300) and not have IPX data packets rejected by a client (e.g., 302) performing the unnecessary determination between different layers of the protocol stack, as described in detail above.

Thus, one embodiment of the present invention provides a method and system for providing true IPX load balancing and does not introduce potential confusion within the network.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for directing transmission of an internetwork packet exchange (IPX) control packet, said method comprising:

determining a primary network interface card (NIC) from a plurality of NICs of a computer system;

recognizing an IPX control packet before said IPX control packet is transmitted over a network; and directing said IPX control packet to be transmitted over said network by said primary NIC.

2. The method as described in claim 1 wherein said IPX control packet comprises a Routing Information Protocol (RIP) packet.

3. The method as described in claim 1 wherein said IPX control packet comprises a Service Advertising Protocol (SAP) packet.

4. The method as described in claim 1 wherein said IPX control packet comprises a Network Basic Input/Output System (NetBIOS) "name recognized" packet.

5. The method as described in claim 1 wherein said network comprises a local area network (LAN).

6. The method as described in claim 1 wherein said network comprises a wide area network (WAN).

7. A computer readable medium having computer readable code embodied therein for causing a computer to direct transmission of an internetwork packet exchange (IPX) control packet comprising:

determining a primary NIC from a plurality of NICs of said computer; and causing an IPX control packet of said computer to be transmitted over a network by said primary NIC which is coupled to said network.

8. The computer readable medium as described in claim 7 wherein said IPX control packet comprises a Routing Information Protocol (RIP) packet.

9. The computer readable medium as described in claim 7 wherein said IPX control packet comprises a Service Advertising Protocol (SAP) packet.

10. The computer readable medium as described in claim 7 wherein said IPX control packet comprises a Network Basic Input/Output System (NetBIOS) "name recognized" packet.

11. The computer readable medium as described in claim 7 wherein said network comprises a local area network (LAN).

12. The computer readable medium as described in claim 7 wherein said network comprises a wide area network (WAN).

13. A computer implemented method for directing transmission of an internetwork packet exchange (IPX) control packet, said computer implemented method comprising:

determining a primary NIC from a plurality of NICs of a server computer system;

recognizing an IPX control packet before said IPX control packet is transmitted over a network; and directing said IPX control packet to be transmitted over said network by said primary NIC.

14. The computer implemented method as described in claim 13 wherein said IPX control packet comprises a Routing Information Protocol (RIP) packet.

15. The computer implemented method as described in claim 13 wherein said IPX control packet comprises a Service Advertising Protocol (SAP) packet.

16. The computer implemented method as described in claim 13 wherein said IPX control packet comprises a Network Basic Input/Output System (NetBIOS) "name recognized" packet.

17. The computer implemented method as described in claim 13 wherein said network comprises a local area network (LAN).

18. The computer implemented method as described in claim 13 wherein said network comprises a wide area network (WAN).

19. A computer system comprising:

a processor;

an addressable data bus coupled to said processor;

a computer readable memory coupled to communicate with said processor for performing a method for directing transmission of an internetwork packet exchange (IPX) control packet, said method comprising:

determining a primary NIC from a plurality of NICs of said computer system;

recognizing an IPX control packet before said IPX control packet is transmitted over a network; and directing said IPX control packet to be transmitted over said network by said primary NIC.

20. The computer system as described in claim 19 wherein said IPX control packet comprises a Routing Information Protocol (RIP) packet.

21. The computer system as described in claim 19 wherein said IPX control packet comprises a Service Advertising Protocol (SAP) packet.

22. The computer system as described in claim 19 wherein said IPX control packet comprises a Network Basic Input/Output System (NetBIOS) "name recognized" packet.

23. The computer system as described in claim 19 wherein said network comprises a local area network (LAN).

24. The computer system as described in claim 19 wherein said network comprises a wide area network (WAN).

* * * * *